United States Patent

Earlougher, Jr.

[15] 3,648,772
[45] Mar. 14, 1972

[54] MISCIBLE-TYPE RECOVERY PROCESS USING FOAM AS A MOBILITY BUFFER

[72] Inventor: Robert C. Earlougher, Jr., Littleton, Colo.

[73] Assignee: Marathon Oil Company, Findlay, Ohio

[22] Filed: Aug. 19, 1970

[21] Appl. No.: 65,335

Related U.S. Application Data

[63] Continuation-in-part of Ser. No. 820,016, Apr. 28, 1969.

[52] U.S. Cl. ............................................. 166/273, 166/274
[51] Int. Cl. ........................................................ E21b 43/22
[58] Field of Search ............... 166/273, 274, 275, 268, 305 R

[56] References Cited

UNITED STATES PATENTS

| | | | |
|---|---|---|---|
| 3,185,634 | 5/1965 | Craig, Jr. et al. | 166/273 |
| 3,196,944 | 7/1965 | Bernard et al. | 166/273 |
| 3,266,570 | 8/1966 | Gogarty | 166/273 |
| 3,323,588 | 6/1967 | Rai et al. | 166/273 |
| 3,335,792 | 8/1967 | O'Brien et al. | 166/273 |
| 3,369,601 | 2/1968 | Bond et al. | 166/273 X |
| 3,406,754 | 10/1968 | Gogarty | 166/273 |
| 3,467,187 | 9/1969 | Gogarty | 166/273 |

*Primary Examiner*—Stephen J. Novosad
*Attorney*—Joseph C. Herring, Jack L. Hummel and Richard C. Willson, Jr.

[57] ABSTRACT

Crude oil is recovered from a subterranean oil-bearing formation having injection means in fluid communication with production means by injecting into the formation 1–20 percent formation pore volume of a micellar dispersion (contains hydrocarbon, surfactant, and aqueous medium) followed by 10–100 percent or more formation pore volume of foam. Drive water can be injected to displace the micellar dispersion and foam toward the production means to recover crude oil. The foam can have a mobility about equal to or less than that of the micellar dispersion. Also, a liquid mobility buffer slug can precede or follow the foam.

26 Claims, No Drawings

MISCIBLE-TYPE RECOVERY PROCESS USING FOAM AS A MOBILITY BUFFER

CROSS REFERENCE TO RELATED APPLICATION

This is a continuation-in-part of my copending application, Ser. No. 820,016, filed Apr. 28, 1969.

BACKGROUND OF THE INVENTION

1. Field of the Invention

This invention relates to injecting a micellar dispersion into an oil-bearing subterranean reservoir and displacing it toward a producing well to recover crude oil therefrom. A slug of foam is injected after the dispersion to protect against fingering.

2. Description of the Prior Art

U.S. Pat. No. 3,185,634 to Craig, Jr. teaches external preparation of a foam, then injection and displacement of the foam through an oil reservoir to recover crude oil. Sodium dioctylsulfosuccinate and modified sodium lauryl sulfate are examples of foaming agents used by Craig, Jr. Water or gas may be used as a drive fluid to displace the injected foam through the formation.

U.S. Pat. No. 3,196,944 to Bernard teaches placing a "high-foaming," oil-soluble surfactant in a low molecular weight liquid hydrocarbon, injecting this liquid into an oil-bearing formation after which a hydrocarbon gas is injected to create a foam bank between the liquid hydrocarbon and gas. Sufficient gas drive is injected to displace the surfactant containing liquid toward a producing well through which petroleum is recovered.

U.S. Pat. No. 3,335,792 to O'Brien et al. discloses an oil recovery process wherein a "foam bank" is injected, followed by a "substantially non-gaseous dilute surfactant solution" and this followed by a drive fluid.

But U.S. Pat. No. 2,827,964 to Sandiford teaches, in Column 4, lines 57–63, that foam decreases the efficiency of oil displacement.

Applicant has discovered that foam can be injected after a micellar dispersion to give good oil recovery results. Foam is employed to impart stable flow to the entire flooding process.

DESCRIPTION OF THE INVENTION

The term "micellar dispersion" as used herein is meant to include micellar solutions, microemulsions, and "transparent" emulsions. Examples of useful micellar dispersions include those defined in U.S. Pat. Nos. 3,254,714, 3,275,075, and 3,301,325 to Gogarty et al.; 3,307,628 to Sena; 3,497,006 to Jones et al.; and 3,506,070 to Jones.

The micellar dispersions contain hydrocarbon, aqueous medium, and surfactant. Cosurfactant(s) and electrolyte(s) can optionally be incorporated into the dispersions. Examples of volume amounts include about 4 to about 70 percent or more hydrocarbon, from 20 to about 90 percent aqueous medium, at least about 4 percent surfactant, from 0.01 to about 20 percent cosurfactant (also identified as cosolubilizer and semipolar organic compound) and about 0.001 to about 5 percent or more (weight percent based on aqueous medium) of electrolyte. The micellar dispersion can be oil-external or water-external but preferably is oil-external or acts like it is oil-external.

Examples of hydrocarbons include crude oil (both sweet and sour), partially refined fractions of crude oil, and refined fractions of crude oil. Specific examples of hydrocarbon include side cuts from crude columns, crude column overheads, gas oils, kerosene, heavy naphthas, napthas, straight-run gasoline, liquefied petroleum gases, propane, pentane, heptane, decane, dodecane, cyclohexane, aryl compounds including benzene, naphthalene, anthracine, and alkylated aryl compounds such as alkyl phenols, etc. Preferably, the hydrocarbon is one locally available and can be crude oil characteristic of hydrocarbon within the reservoir being flooded. Also, the hydrocarbon can be unsulfonated hydrocarbon within the surfactant, e.g., heavy vacuum gas oils in petroleum sulfonates.

The aqueous medium can be soft water, brackish water, or brine water. Preferably, the water is soft but it can contain small amounts of salts which are preferably characteristic of the ions within the subterranean formation being flooded.

Surfactants useful in the micellar dispersion include nonionic, cationic, and anionic surfactants. Specific examples include those taught in U.S. Pat. No. 3,254,714 to Gogarty et al. Other useful surfactants include Duponol WAQE (a 30 percent active sodium lauryl sulfate marketed by DuPont Chemical Corp., Wilmington, Delaware), Energetic W—100 (a polyoxyethylene alkylphenol marketed by Armour Chemical Co., Chicago, Illinois), Triton X—100 (an alkyl phenoxy polyethoxyethanol marketed by Rohm & Haas, Philadelphia, Pennsylvania), Arquad 12—50 (a 50 percent active dodecyl trimethyl ammonium chloride marketed by Armour Chemical Co., Chicago, Illinois), and like materials.

Preferably, the surfactant is petroleum sulfonate, also known as alkyl aryl naphthenic sulfonate. Examples of preferred surfactants are the sodium and ammonium petroleum sulfonate having average equivalent weights within the range of about 360 to about 520, and more preferably about 390 to about 450. Equivalent weight is defined as the molecular weight of the petroleum sulfonate molecule divided by the number of sulfonate groupings within that molecule. The surfactant can be a mixture of low, medium, and high average equivalent weight sulfonates or a mixture of two or more different surfactants.

Cosurfactants useful with the invention include alcohols, amines, esters, aldehydes, ketones, and like materials containing about one to about 20 carbon atoms. More preferably, the cosurfactant contains about three to about 16 carbon atoms. Specific examples include alcohols such as isopropanol, n- and isobutanol, amyl alcohols such as n-amyl alcohol, 1-and 2-hexanol, 1-and 2-octanol, decyl alcohols, dodecyl alcohols, etc., alkaryl alcohols such as p-nonylphenol, compounds containing more than one hydroxy grouping and optionally containing an ether or like group(s), etc., and alcoholic liquors such as fusel oil. Preferably, about 0.1 to about 5 percent by volume of cosurfactant is useful in the micellar dispersion. Mixtures of two or more cosurfactants are also useful.

Electrolytes useful in the micellar dispersions include inorganic acids, inorganic bases, inorganic salts, organic acids, organic bases, and organic salts. Specific examples of electrolytes include sodium hydroxide, sodium chloride, sodium sulfate, hydrochloric acid, sulfuric acid, and those electrolytes found in U.S. Pat. Nos. 3,330,343 to Tosch et al. and 3,297,084 to Gogarty et al.

Mobility buffers, as defined in this invention, are also useful to facilitate displacement of the slug of micellar dispersion through the reservoir. The mobility buffer can optionally follow or precede the slug of foam. The buffer slug preferably has a mobility favorable to uniform displacement of the micellar dispersion slug. Mobility-reducing agents such as high molecular weight polymers are used to increase the viscosity of the buffer solution, i.e., reduce the mobility of the buffer solution flowing in the reservoir. Mobility-reducing agents useful with the invention include partially hydrolyzed, high molecular weight polyacrylamides, polysaccharides, polyethylene oxides, carboxy methylcellulose (C.M.C.), carboxyvinyl polymers; in general, water-soluble polyelectrolytes having molecular weights in excess of 500,000, and like materials. Preferred mobility reducing agents are those compatible with the formation (i.e., ions within the formation and type of rocks, etc.), micellar dispersion and foam. The Dow Pusher polymers, e.g., Dow Pusher 530 and 700 are particularly effective with the invention.

Foaming agents useful in this invention include those compounds exhibiting nonionic, cationic, anionic, or amphoteric properties and which are capable of producing foam either in a substantially hydrophilic or substantially oleophilic environment. Examples of such agents include Triton X—100 (octyl phenoxy polyethoxy), nonionic, manufactured by Rohm & Haas Co., Philadelphia, Pennsylvania; Petrowet R (sodium hydrocarbon sulfonate), anionic, manufactured by E. I. Du- Pont deNemours & Co., Wilmington, Delaware; O. K. Liquid [combination of anionic and nonionic surfactants, also identified as a modified ammonium alkyl sulfate, pour point = 10° F., open cup flash point = 103° F., pH = 6.3 and density lb./gal. = 8.2], manufactured by Proctor & Gamble, Cincinnati, Ohio, Velvetex BA, (alkyl amido betane), amphoteric, manufactured by the Textilana Corp. of Hawthorne, California; Quic-Foam (oxyalkylated, sulfated alcohol), nonionic, manufactured by the Baroid Division of the National Lead Company, New York, New York; Empilan CDE, (coconut diethanolamide), nonionic, manufactured by Marchon Products, Ltd., Whitehave, Cumberland, England; Triton X— 165 (octyl phenoxy polyethoxy ethanol), marketed by Rohm & Haas Co., Philadelphia, Pennsylvania; Alvasol 160 (modified alkyl sulfonate), anionic, manufactured by Synthron, Inc., Ashton, Rhode Island; Aminol CO-S (diethanolamine superamide), nonionic, marketed by Finetex, Inc., East Patterson, New Jersey; FC—95 (fluorochemical surfactant) anionic, manufactured by the Minnesota Mining & Manufacturing Co., St. Paul, Minnesota; Hyonic FA—75 (modified fatty alkylolamide), marketed by Nopco Chemical Co., (Diamond Shamrock Corp., Cleveland, Ohio); Miranol HM Concentrate (ethylene cycloamidolauryl, 2-hydroxy ethylene sodium alcoholate methylene sodium carboxylate), marketed by the Miranol Chemical Co., Irvington, New Jersey; Nacconal NR (alkyl aryl sulfonate), manufactured by the Allied Chemical Corp; Morristown, New Jersey; Pluronic L 44 (condensation product of ethylene oxide with propylene glycol), manufactured by the Wyandotte Chemical Co., Wyandotte, Michigan; Product BCO (C-cetyl betane), manufactured by E. I. DuPont deNemours & Co.; Renex 650 (polyoxyethylene alkylaryl ether), manufactured by the Atlas Chemical Co., Wlmington, Delaware; Gafen FA—6 (alkyl polyethleneoxy ethanol), marketed by General Aniline and Film Corp., (GAF Corp.) New York, New York; Gafen FA—7 (alkyl aryl polyethlenoxy ester), manufactured by GAF Corp.; Superamide L—9A, L—9C (high activity lauric acid diethanolamine condensate), manufactured by Onyx Chemical Co., (Millmaster Onyx Corp.) New York, New York; DuPonol WAQE (sodium lauryl sulfonate), DuPonol RA (modified ester alcohol sodium salt), and DuPonol EP (fatty alcohol alkyloamine sulfate), all manufactured by E. I. DuPont deNemours & Co.; etc. Other examples are illustrated in the *Encyclopedia of Surface-Active Agents*, Vol. 2, Part II, Chemical Publishing Co., (1964) by J. P. Sisley, and in *Detergents* and *Emulsifiers*, (1967), an alphabetical catalogue published by the John W. McCutcheon Co., Inc.

The foam can contain a gas such as air, nitrogen, carbon dioxide, oxygen, gaseous products from the combustion of natural gas and other hydrocarbons, and any gas compatible with the foaming agent and formation. Preferably, the gas is substantially water insoluble at reservoir conditions. Also, the foam can contain a mobility-reducing agent; examples include those mobility reducing agents previously defined.

About 10 percent to about 100 percent or more formation pore volume of the foam is injected into the subterranean formation. Preferably about 20 percent to about 70 percent formation pore volume is used and more preferably about 40 percent to about 60 percent formation pore volume is injected. As mentioned previously, a liquid mobility buffer can precede or follow the foam. Also, a drive fluid, other than the foam, e.g., drive water, can follow the foam to displace the micellar dispersion toward the production means.

The foam may be formed in any way, e.g., in situ, at the surface, in the injection wellbore or in the formation.

The foam preferably has a mobility within the formation about equal to or less than about that of the micellar dispersion. However, mobilities greater than the micellar dispersion are also useful. The foam may be followed, or preceded, by a liquid mobility buffer, preferably water containing a mobility reducing agent.

Thereafter, the foam and/or mobility buffer can be followed by a drive fluid; however, sufficient foam can be injected to displace the micellar dispersion (may be dissipated by the time it reaches the production well) through the reservoir. Drive fluids useful with the invention include water; inert gases (e.g., $N_2$); gases such as natural gas, carbon dioxide, air, etc.; liquefied petroleum gases; aqueous solutions of alcohols and other organic materials; mixtures of the above (e.g., water and natural gas); and like materials. The drive fluid can be modified to give desired mobility and corrosion characteristics.

Specific embodiments of the invention are illustrated by the following examples. Unless otherwise specified, percents are based on volume.

EXAMPLE I

A 4-foot long by 3-inch diameter Berea sandstone core having an average permeability of 300 millidarcies and a porosity of 18.4 percent is first saturated with water, flooded with crude oil and then waterflooded to a 57 percent residual oil saturation. Then, a 4 percent pore volume oil-external micellar dispersion slug composed of 3.9 grams ammonium petroleum sulfonate, 39.6 ml. hydrocarbon, 47.4 ml. water, and 1.2 ml. of an alcohol mixture is injected into the core at a rate of 40 cc./hr. The slug is followed by a 10 percent pore volume liquid mobility buffer containing water, 1,200 p.p.m. of Dow Pusher 530 (a partially hydrolyzed, high molecular weight polyacylamide marketed by Dow Chemical Co.) and 1 percent fusel oil. Thereafter, a foam is injected into the core; the foam obtained by simultaneously injecting a 1 percent solution of O. K. Liquid (modified ammonium alkyl sulfate) dissolved in distilled water and $N_2$ into a foam generator [a glass or sand-packed column which serves as a mixing chamber, according to the procedure described in "The Streaming Potential and Rheology of Foam," Trans. AIME, V. 240 (Dec. 1967), pp. 359–368, see p. 360. FIG. 2, for a detailed description of the foam generator]. The foam produced has a quality of 94 percent gas and 6 percent liquid at atmospheric pressure (Littleton, Colorado, U.S.A.). The foam is injected into the core at a rate of 50 cc./hr. at an upstream pressure of 140 p.s.i.g. About 90 percent of the total hydrocarbon in the core is recovered.

EXAMPLE II

A 4-foot long by 3-inch diameter Berea sandstone core having an average permeability of 750 millidarcies and a porosity of 19.8 percent is first saturated with water, then flooded with crude oil and thereafter waterflooded to residual oil saturation, latter equal to 51.8 percent. A 4 percent pore volume micellar dispersion slug composed of 47.4 percent water, 37.5 percent crude oil, 12.8 percent of a petroleum sulfonate, and 2.3 percent alcohol is injected into the core at a rate of 40 cc./hr. at 100 p.s.i.g. The dispersion is followed by the injection of 10 percent pore volume mobility buffer (defined in Example I) and this in turn followed by the injection of a foam identical to that in Example I except the quality is 93 percent and the upstream pressure is 100 p.s.i.g. Total oil recovered is 81.1 percent.

EXAMPLE III

A 4-foot by 3-inch Berea sandstone core having an average permeability of 468 md. and a porosity of 20.9 percent is treated as in Example I, residual oil saturation is 34 percent A 4 percent pore volume micellar dispersion containing 37.8 percent hydrocarbon, 8.3 percent ammonium petroleum sulfonate (average equivalent weight about 420–440), 52.2 percent water containing about 400 p.p.m. of dissolved solids, and 1.9 percent alcohol is injected into the core at a rate of 40 cc./hr. and 100 p.s.i.g. upstream pressure. A 10 percent pore volume mobility buffer composed of 1,200 p.p.m. Dow Pusher 530 (partially hydrolyzed, high molecular weight polyacrylamide) dissolved in water containing about 400 p.p.m. of total dissolved solids is then injected, followed by 1.4 pore volumes foam obtained from 1 percent Aerosol MA in distilled water. Total oil recovery is 79.1 percent.

These examples teach specific embodiments of the invention. They are not meant to limit the invention to conditions described therein. For instance, foam used in the invention may be prepared in many ways; externally, in situ, etc.; any convenient gas compatible with the reservoir can be mixed with a foaming agent to produce foam in sundry equipment. Variations and equivalents of the invention obvious to persons skilled in the art are meant to be included within the scope of the invention as defined in the specification and appended claims.

What is claimed is:

1. An improved process for recovering crude oil from a subterranean oil-bearing formation having at least one injection means in fluid communication with at least one production means, the process comprising:
   a. injecting into the formation a micellar dispersion comprised of hydrocarbon, surfactant, and aqueous medium,
   b. injecting into the formation a foam, and then
   c. injecting sufficient, substantially aqueous drive fluid into the formation to displace the micellar dispersion and foam toward the production means to recover crude oil through said production means.
2. The process of claim 1 wherein from about 1 to about 20 percent formation pore volume of the micellar dispersion is injected into the formation.
3. The process of claim 1 wherein the micellar dispersion contains cosurfactant(s) and/or electrolyte(s).
4. The process of claim 1 wherein about 10 percent to about 100 percent formation pore volume of the foam is injected into the subterranean formation.
5. The process of claim 4 wherein about 30 percent to about 70 percent formation pore volume of foam is injected into the subterranean formation.
6. The process of claim 1 wherein the foam has a mobility about equal to or less than that of the micellar dispersion flowing in the formation.
7. The process of claim 1 wherein about 2 percent to about 10 percent formation pore volume of micellar dispersion is injected into the formation.
8. The process of claim 1 wherein the foam is comprised of an aqueous medium, foaming agent, and gas.
9. The process of claim 1 wherein the foam contains a mobility reducing agent to lower the mobility thereof.
10. The process of claim 9 wherein the mobility reducing agent is a partially hydrolyzed, high molecular weight polyacrylamide.
11. An improved process for recovering crude oil from an oil-bearing subterranean formation having at least one injection means in fluid communication with at least one production means, the process comprising the sequential injections into the formation of:
   a. about 1 to about 20 percent formation pore volume of a micellar dispersion comprised of hydrocarbon, surfactant, and aqueous medium,
   b. a liquid mobility buffer having a relative mobility about equal to or less than that of the micellar dispersion flowing in the formation,
   c. about 10 percent to about 100 percent formation pore volume of a foam comprised of aqueous medium, foaming agent, and gas,
   d. then sufficient drive fluid to displace the micellar dispersion and foam toward the production means to recover crude oil through said production means.
12. The process of claim 11 wherein the micellar dispersion contains cosurfactant(s) and/or electrolyte(s).
13. The process of claim 11 wherein about 1 to about 20 percent formation pore volume of the mobility buffer is injected into the formation.
14. The process of claim 11 wherein about 20 percent to about 70 percent formation pore volume of the foam is injected.
15. The process of claim 11 wherein a mobility-reducing agent is incorporated into the foam.
16. The process of claim 15 wherein the mobility-reducing agent is a partially-hydrolized, high molecular weight polyacrylamide.
17. An improved process for recovering crude oil from a subterranean oil-bearing formation having at least one injection means in fluid communication with at least one production means, the process comprising:
   a. injecting into the formation a micellar dispersion comprised of hydrocarbon, surfactant, and aqueous medium,
   b. injecting into the formation a foam, and
   c. displacing the micellar dispersion and foam toward the production means to recover crude oil through said production means.
18. The process of claim 17 wherein the micellar dispersion contains cosurfactant(s) and/or electrolyte(s).
19. The process of claim 17 wherein the foam is comprised of an aqueous medium, foaming agent, and gas.
20. The process of claim 17 wherein the foam contains a mobility reducing agent.
21. The process of claim 20 wherein the mobility reducing agent is a partially hydrolyzed high molecular weight polyacrylamide.
22. The process of claim 17 wherein a liquid mobility buffer is injected into the formation previous to the injection of the foam.
23. The process of claim 17 wherein foam is used to displace the micellar dispersion and injected through the formation.
24. A process for recovering crude oil from a subterranean oil-bearing formation having at least one injection means in fluid communication with at least one production means, the process comprising:
   a. injecting into the formation a micellar dispersion comprised of hydrocarbon, surfactant, and aqueous medium,
   b. forming in situ of the formation a foam, and
   c. displacing the micellar dispersion and foam toward the production means to recover crude oil through said production means.
25. The process of claim 24 wherein the foam is formed in situ from components comprised of an aqueous medium, foaming agent and gas.
26. The process of claim 25 wherein the components include a mobility-reducing agent.

* * * * *